March 5, 1957  W. T. HAGE  2,783,947
PRESSURE RESPONSIVE MECHANICAL ELECTRICAL RATIO
CONTROLLER FOR AIR SWEPT PULVERIZER FEED
Filed May 22, 1951  3 Sheets-Sheet 1
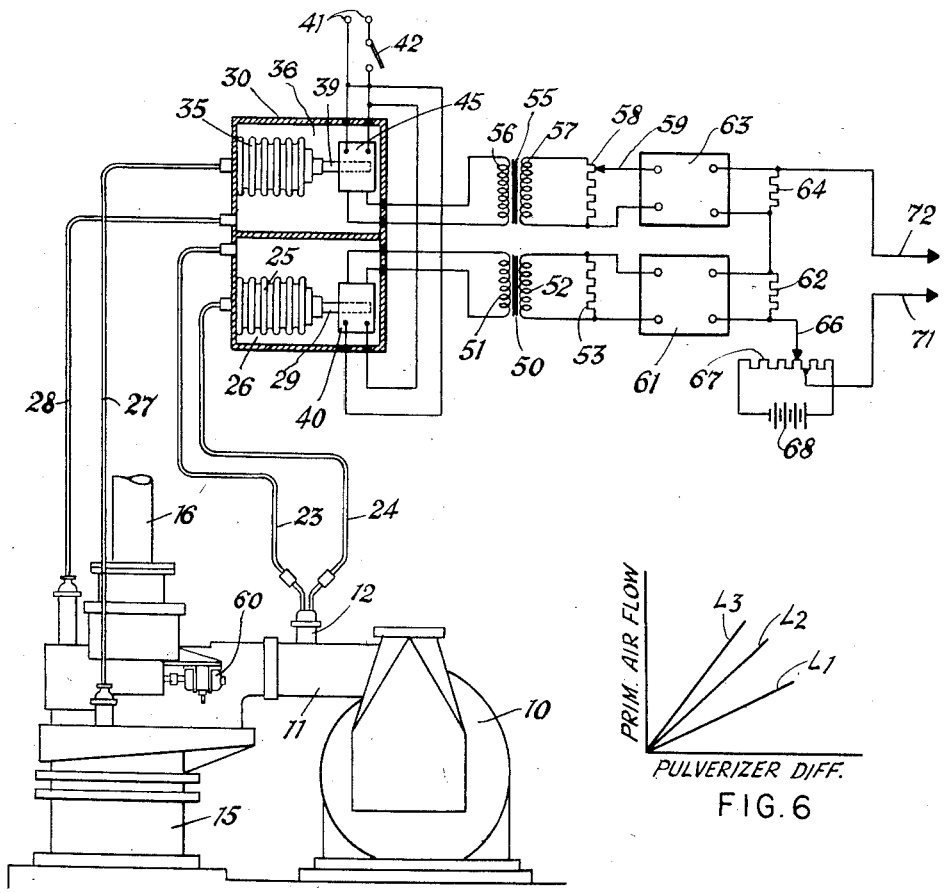
FIG. 1
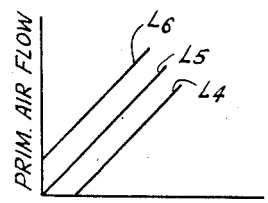
FIG. 6
FIG. 7
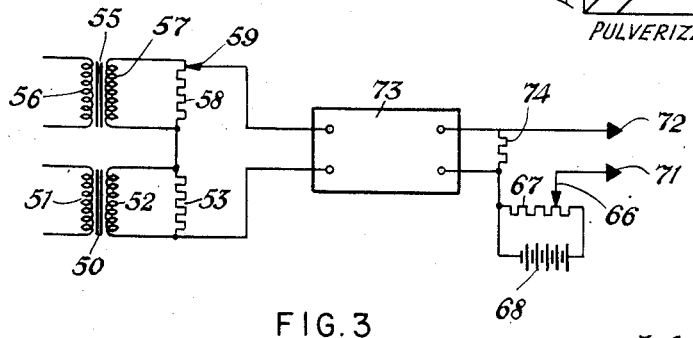
FIG. 3
INVENTOR
William T. Hage
BY
JP Moran
ATTORNEY _United States Patent Office_

2,783,947
Patented Mar. 5, 1957

2,783,947

PRESSURE RESPONSIVE MECHANICAL ELECTRICAL RATIO CONTROLLER FOR AIR SWEPT PULVERIZER FEED

William T. Hage, Alliance, Ohio, assignor to The Babcock & Wilcox Company, Rockleigh, N. J., a corporation of New Jersey Application May 22, 1951, Serial No. 227,715

3 Claims. (Cl. 241—34)

This invention relates to a pressure-responsive mechanical-electrical ratio controller useable in regulating the operation of a raw material feeder to an air-swept pulverizer.

The pressure differential across an air-swept pulverizer is a measure of the quantity of material in the pulverizer and the pressure drop between two points along the air supply path is a measure of the rate of air supply through the pulverizer. For best operating results at any given output or load, it is desirable to maintain a constant ratio between the quantity of air and the pulverized material leaving the pulverizer, in order to attain the most efficient overall pulverizer performance as regards quality of product and power consumption.

In air-swept pulverizer installations, particularly when used for supplying pulverized fuel to furnace burners, the primary or carrier air supply through the pulverizer is varied with the load or fuel demand. By controlling the rate of feeding material to the pulverizer in accordance with the measured pressure drop along the air supply path, the material-to-air ratio can be maintained constant for a given output of the pulverizer.

The present invention comprises a novel and simple ratio controller for the pulverizer feeder, which is adapted to automatically maintain any desired ratio between the primary air flow and the amount of material, or pulverized fuel, delivered by the pulverizer. To this end, means are provided for measuring the pressure drop along the primary air supply path and the pressure differential through the pulverizer. Through the medium of a pair of electro-mechanical transducers, these pressure differential determinations are separately converted into corresponding electric potentials. The potentials are suitably combined to produce a control or signal voltage, and this voltage is utilized to determine the operation of a control element in the control circuit for the electrically controlled pulverizer feeding means to vary the pulverizer feeding rate thereof in correspondence with the rate of air supply to the pulverizer.

Means are provided to adjust the relative values of the two potentials corresponding to the respective pressure differentials, thereby effecting a change in the slope of the load line, or in the air-material ratio. Other means are provided for adjusting the threshold value of the control voltage to thereby change the position of the load line. These adjustment means may desirably comprise simple potentiometers or adjustable resistances.

For an understanding of the invention principles, reference is made to the following description of typical embodiments thereof as illustrated in the accompanying drawings.

In the drawings:

Fig. 1 is a schematic elevation view of an air-swept pulverizer installation embodying the invention ratio controller;

Fig. 3 is a schematic wiring diagram of a portion of a modified form of the ratio controller;

Figs. 6 and 7 are graphs illustrating changes in the slope and position respectively of the load line.

Figure 2:
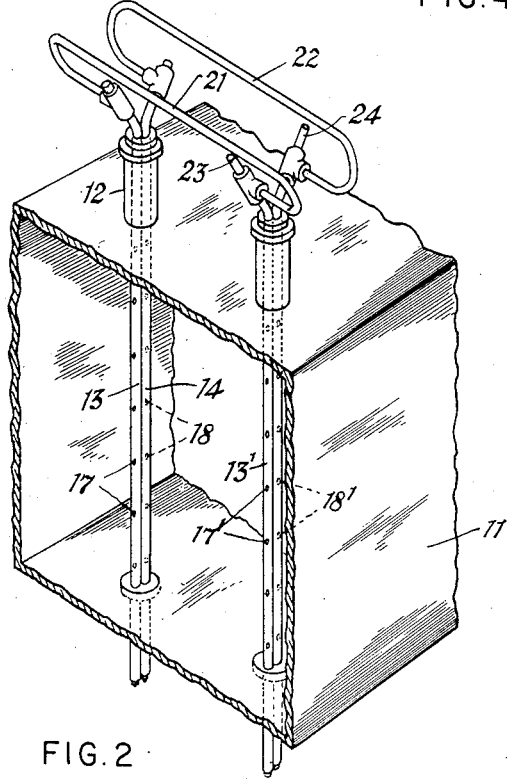
Fig. 2 is a sectional perspective view of the air flow rate determining arrangement for the air supply conduit.

Referring to Fig. 1, primary air is delivered by a fan 10 through a duct or conduit 11 to a pulverizer 15 having a coal supply pipe 16 supplying coal to a feeder operated by an electric motor 60. The velocity head through duct 11, which is a measure of the rate of flow of the air therethrough, is determined by a pitot tube arrangement 12 shown more clearly in Fig. 2.

Referring to this latter figure the pitot tube arrangement comprises two pairs of apertured tubes such as 13, 14 and 13′, 14′ which extend across duct 11, the respective pairs of tubes being spaced transversely of the duct. In practice, the tubes of each pair are suitably brazed or otherwise secured together as a unit. The apertures 17 of tube 13 open in the opposite direction from the apertures 18 of tube 14, the same being true of the apertures 17′ and 18′ of the tubes 13′ and 14′.

Each pair of tubes is brought out through the top of the conduit into mounting or coupling means 12 and 12′, with the tubes 13 and 13′ being interconnected by a conduit 21 and the tubes 14 and 14′ by a conduit 22. With the arrangement shown in Fig. 2, a number of connections may be made but, for the purpose of the present invention, only two (2) taps 23 and 24 are used. Tap 24 is connected to the interior of a bellows 25 mounted in a sealed compartment 26 of a housing 30. Tap 23 is connected directly to the interior of compartment 26, so that bellows 25 is responsive to the velocity head measured by the taps 23 and 24.

Similarly, the pressure differential through pulverizer 15 is determined by a pair of pressure taps 27 and 28, with tap 27 being connected near the air input of pulverizer 15 and tap 28 near the air output or exit of the pulverizer. The pressure of tap 27 is applied to the interior of a bellows 35 mounted in a second sealed compartment 36 of housing 30, and the pressure of tap 28 is applied to the interior of compartment 36. Thus, bellows 35 is responsive to the difference in pressures measured by taps 27 and 28.

With the arrangement so far described, movement of bellows 25 is responsive to the rate of air flow through conduit 11, and movement of bellows 35 is responsive to the pressure differential through pulverizer 15.

In accordance with the invention, means are provided to convert these pressure determinations separately into corresponding electric potentials. For this purpose, bellows 25 has connected thereto an armature or plunger 29 of magnetic material, such as iron, and bellows 35 has connected thereto a similar armature 39. Plunger 29 is movable within a coil 40 and plunger 39 is movable within a coil 45. Coils 40 and 45 have an alternating current potential applied thereto, in a manner described more fully hereinafter, through a pair of terminals 41, a disconnect switch 42 being provided in the potential supply circuit. The output of coil 40 is applied to the primary winding 51 of a transformer 50 having a secondary winding 52. The output of coil 45 is applied to the primary winding 56 of a transformer 55, having a secondary winding 57.

With a steady alternating current potential applied to the coils 40 and 45, the output potentials of these coils are dependent upon the positions of armatures 29 and 39 therein. The positions of these armatures are, in turn, controlled by the bellows 25 and 35. In turn, the extent of dilation of bellows 25 is a measure of the rate of air flow through duct 11, and the extent of dilation of bellows 35 is a measure of the pressure differential through pulverizer 15. Hence, the potentials applied to transformer primary windings 51 and 56 correspond, respectively, to the rate of primary air flow through duct 11 and the pressure differential through pulverizer 15. These electric potentials applied to the primary windings are used to produce a control voltage corresponding to the resultant of the measured air supply rate and the measured pressure drop, and this control voltage is applied to a control element in the supply circuit of motor 60 which controls the feed of material to pulverizer 15.

In the arrangement shown in Fig. 1, the voltage of secondary winding 52 is applied across a resistor 53 and that secondary winding 57 is applied across a resistor 58 having an adjustable tap 59 associated therewith. The potential drop across resistor 53 is amplified by an amplifier 61 and applied to the output resistor 62. A portion of the potential drop across resistor 58, as determined by the position of tap 59, is amplified by amplifier 63 and applied to an output resistor 64. Resistors 62 and 64 are connected in series, and one end of resistor 62 is connected to the tap 66 of a potentiometer 67, connected across a source of bias potential 68. A fixed tap on potentiometer 67 and the outer end of resistor 64 are respectively connected to terminals 71 and 72 across which the resultant control voltage is thus applied, and used as explained more fully hereinafter to control the operation of pulverizer feeder motor 60.

Fig. 3 illustrates an alternative arrangement for developing the control voltage, in which resistors 53 and 58 are connected in series, and the common voltage drop across both resistors is applied to an amplifier 73 whose output is impressed on a resistor 74. One terminal of resistor 74 is connected to terminal 72 and the other terminal to one end of potentiometer 67 connected across biasing potential source 68. The adjustable contact 66 of the potentiometer is connected to terminal 71.

Figure 4:
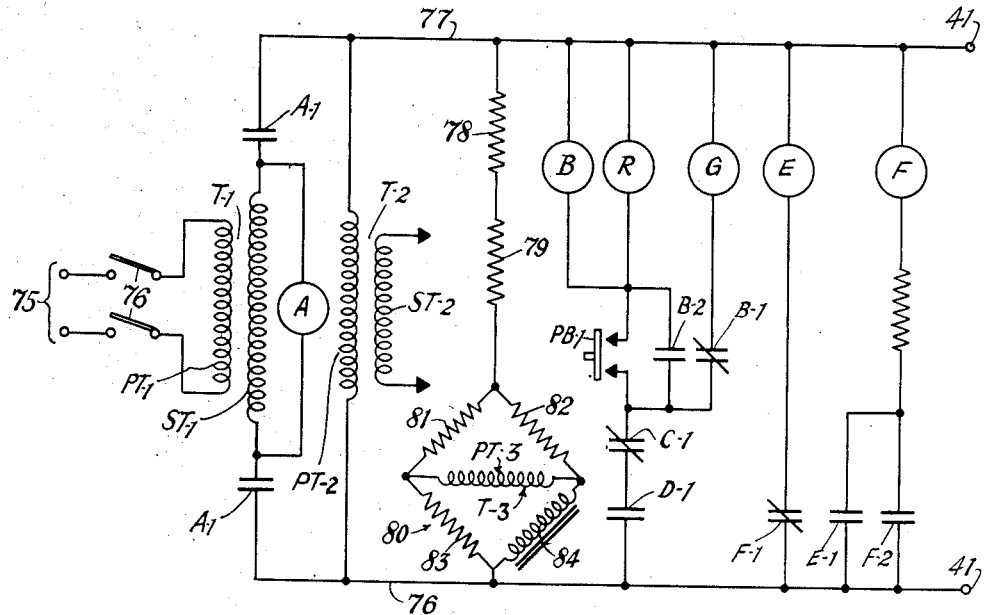
Fig. 4 is a schematic wiring diagram of the master supply and control panel of the pulverizer installation.
Figure 5:
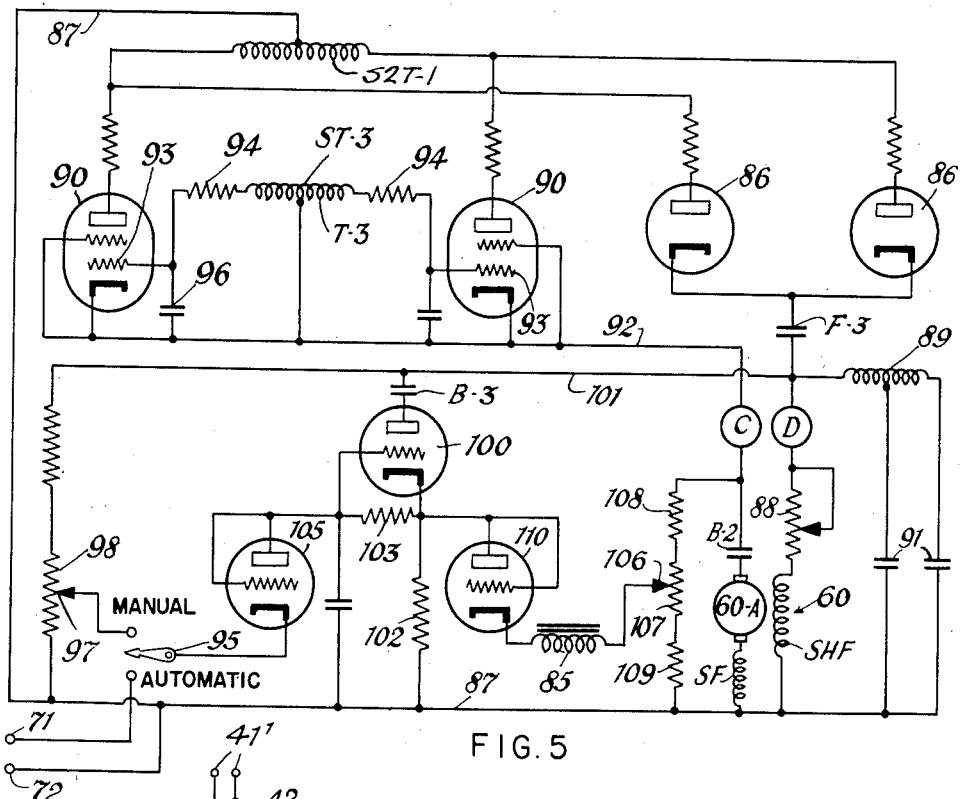
Fig. 5 is a schematic wiring diagram of the control circuit of the pulverizer feeder means.

The control arrangement for the feeder motor 60, and the supply circuits for the apparatus, are shown in Figs. 4 and 5. This control arrangement is known as a "Thy-Mo-Trol," and is manufactured by the General Electric Co. Referring to Fig. 4, a suitable source of A.-C. potential is connected to main supply terminals 75 which are connected, through disconnect switches 76, to the primary winding PT–1 of a transformer T–1. The secondary winding ST–1 of the transformer is connected, through normally open relay contacts A–1, to supply lines 76, 77. Relay A is connected in shunt with secondary winding ST–1 so that, when disconnect switches 76 are closed, relay A will be energized to close contacts A–1. The supply of current for the heater filaments of electronic valves in the control circuit of Fig. 5 is derived from the secondary winding ST–2 of a transformer T–2 having its primary winding PT–2 connected across lines 76 and 77.

The control for motor 60 includes a bridge 80 which is connected between lines 76, 77 in series with resistors 78, 79. Bridge 80 includes fixed resistors 81, 82 and 83, comprising three (3) arms of the bridge, and the A.-C. or power coil 84 of a saturable reactor having a D.-C. or control coil 85 (Fig. 5). The primary winding PT–3 of a transformer T–3 is connected across the diagonal of bridge 80, and the potential developed across primary winding PT–3 is a function of the impedance of winding 84, the resistors 81, 82 and 83 being fixed. As will be understood by those skilled in the art, the impedance of coil 84 is, in turn, a function of the saturation of its D.-C. control winding 85. As will be explained more fully hereinafter, the saturation of control coil 85 is made a function of the resultant control voltage derived at terminals 71, 72 (Figs. 1 and 3).

Referring to Fig. 5, motor 60 comprises an armature 60A, a shunt field winding SHF and a series field winding SF. The armature and the field windings are supplied with direct current through rectifying valve arrangements supplied with potential from secondary winding S2T–1. The shunt field winding SHF receives full wave rectifying current from a pair of valves 86, 86 having their anodes connected to opposite terminals of winding S2T–1. A conductor 87 is connected to the mid-point of this winding. The cathodes of diode rectifiers 86, are jointly connected, through normally open relay contacts F–3, a relay D, and a potentiometer 88 to one terminal of winding SHF, the other terminal thereof being connected to conductor 87. A smoothing circuit including inductances 89 and condensers 91 is connected across the shunt field circuit to smooth out ripples in the rectified current.

The current supply for armature winding 60A and series field SF is provided from a pair of "Thyratrons" 90 having anodes connected to opposite ends of winding S2T–1 and cathodes connected to a common conductor 92. The latter is connected, through an overload relay C and normally open relay contacts B–2, to one terminal of armature 60A, and the other terminal of field winding SF is connected to conductor 87.

The time period during which "Thyratrons" 90 supply current to the armature circuit is a function of the phase relation of the grid potential and anode potential of the "Thyratrons." The control grids 93 of the "Thyratrons" are connected through resistors 94 to opposite terminals of secondary winding ST–3 of transformer T–3, the mid-point of winding ST–3 being connected to line 92. Condensers 96 are connected between the control grids 93 and the cathodes of the "Thyratrons." The potential across winding ST–3 is a direct function of that of PT–3 which, as previously explained, is dependent upon the saturation of the saturable reactor 84, 85.

The control voltage developed across terminals 71, 72 (Figs. 1 and 3) is applied to the circuit of Fig. 5 by connecting terminal 72, for example, to common conductor 87, and terminal 71 to the "automatic" contact of a "manual-automatic" switch 95. The other contact of switch 95 is connected to the adjustable contact 97 of a potentiometer 98 which, with manual operation, is used to control the speed of operation of motor 60.

The control arrangement includes a triode 100 receiving a D.-C. potential (rectified by diodes 86) from line 101 connected to the shunt field circuit, the application of potential to the anode of triode 100 being controlled by normally open contacts B–3. The arm of switch 95 is connected to the cathode of a triode 105 whose plate and grid are connected to the grid of triode 100. The cathode of triode 100 is biased by a resistor 102 connected to common line 107, and the grid bias is provided by a resistor 103 connected between the cathode and grid of valve 100. Variations in the control voltage will vary the potential of the cathode of triode 105 relative to its plate and grid potential, and correspondingly vary the grid potential of triode 100. In turn, this varies the current flow through triode 100 and thus the plate and grid potential of a third triode 110 whose cathode is connected to one terminal of the D.-C. control coil 85 of the saturable reactor. The other terminal of coil 85 is connected to the movable contact 106 of a potentiometer 107 connected in shunt with the armature circuit in series with resistors 108 and 109.

The current flow through coil 85 is a function of the potential difference between contacts 106 and 97, with manual control, or, with automatic control, it is a function of the potential difference between terminal 71 and contact 106. The terminal 71 has the potential of the control voltage, which is a resultant of the pressure differential through the pulverizer and the air flow rate through duct 11. Consequently, the current flow through coil 85 is a function of the ratio of such pressure differential and air flow rate.

The impedance of power coil 84 of the saturable reactor is a function of the degree of saturation of coil 85, and thus a function of the ratio of the pulverizer pressure differential and the air flow rate. As the potential across winding PT-3 is, in turn, a function of the impedance of coil 84, its phase relation to the plate potentials of "Thyratrons" 90 is also a function of such ratio.

The portion of any cycle during which the "Thyratron" 90 conduct current to the armature circuit is a function of the relative phases of the anode and grid voltages of the "Thyratrons." Therefore, the flow of current to armature 60A, and thus its rate of operation or voltage applied thereto, is a direct function of the pulverizer pressure differential and air flow rate ratio.

To place the system in operation, disconnect switches 76 are closed and a timer relay E is energized through normally closed contacts F-1. Also, the filament heating transformer T-2 is energized. After a period of five minutes, timer E closes its contacts E-1 to pick up relay F which is a hold-in relay keeping the shunt field circuit closed during voltage dips. Relay F closes hold contacts F-2, opens contacts F-1 to drop the timer relay E, and closes contacts F-3 to energize the shunt field circuit. As the shunt field circuit is energized, relay D picks up to close contacts D-1. This relay opens if the shunt field current fails. Push-button PB-1 may now be closed to close main contactor B which closes hold contacts B-2. This lights red lamp R, and green lamp G is de-energized through opening of contacts B-1. Contacts B-3 apply potential to triode 100, and contacts B-2 energize the armature circuit.

Thus, closure of the push-button sets the pulverizer operation on "automatic" and this operation continues as long as desired, provided overload relay C, in the armature circuit, does not open to break the holding circuit for the motor contactor. Normally, however, the switch 95 is thrown to the "manual" position in starting the system, with the speed being adjusted by contact 97 until such time as a sufficient supply of material has been delivered to the pulverizer to maintain normal operation. The switch 95 is then thrown to the "automatic" position so that further feeding of material is controlled in accordance with variations in the rate of primary air flow. This latter, in turn, particularly in furnace installations, is a measure of the load on the pulverizer.

Figs. 6 and 7 illustrate how the slope and position of the load line may be changed in a relatively simple manner by the system of the present invention. In both of these figures, the load line represents the relation between the rate of air flow and the pulverizer pressure differential, these two factors being plotted as a pair of perpendicularly related co-ordinates. Referring to Fig. 6, three different angular relations of the load line L are illustrated, representing three different ratios of the air flow and the pulverizer differential pressure. The three positions, L₁, L₂ and L₃, or any other angular position, are selected by adjustment of tap 59 (Fig. 1 or 3) along resistor 58. This changes the relative effects of the potential drops across resistors 53 and 58 on the output control voltage.

The change in the absolute position of the load line L is illustrated in Fig. 7. This is accomplished by shifting the tap 66 of potentiometer 67 which changes the absolute value of the control voltage. In the present instance, such change in the relation of the two factors, and the change in the position of the load line can be simply and easily effected by making the controlling resistors of the type operable by turning a knob or pointer. These knobs can be suitably calibrated with a scale, and both mounted at a suitable accessible operating point.

Figure 8:
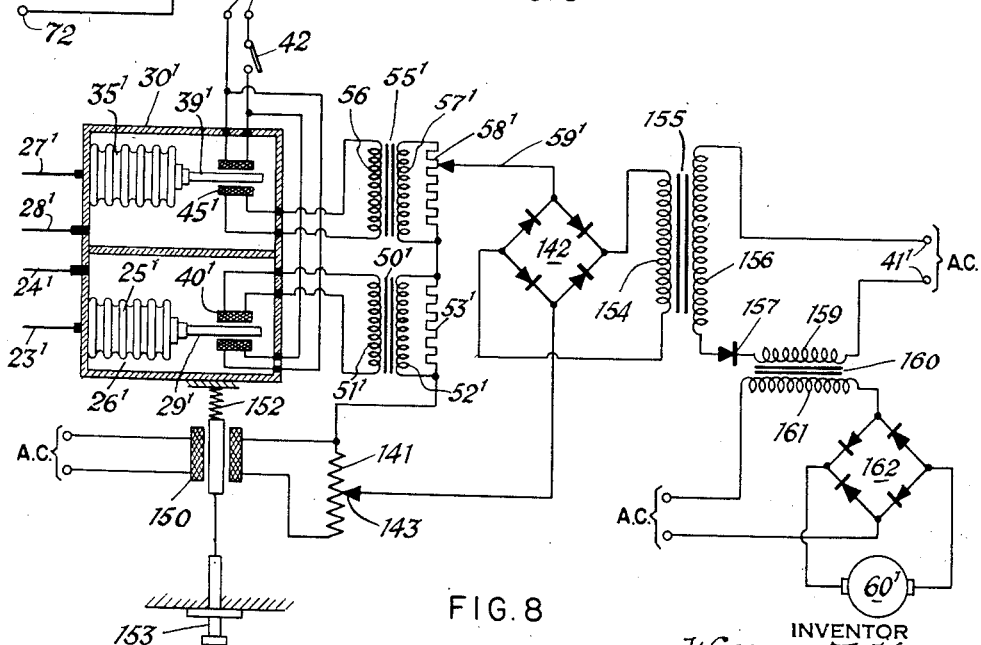
Fig. 8 is a schematic view of a further modified form of the ratio controller.

Fig. 8 shows an alternative arrangement of the invention control system in which control of the motor 60' is effected solely by magnetic amplifiers and relays. In this figure, parts corresponding to the elements shown in Fig. 1 have been given the same reference numerals primed. Core 29', operated by bellows 25' responsive to the primary air flow, controls the flux of a coil 40' and core 39' operated by bellows 35' in accordance with the pressure differential through the pulverizer, controls the flux of a coil 45'. Coils 40' and 45' are connected through transformers 50', 55' across resistors 53', 58', respectively. These resistors are connected in series with each other and in series with a potentiometer 141 and a full wave rectifier 142. Potentiometer 141 has an A.-C. potential applied thereto through a transformer 150 having a movable core 151. Spring 152 biases core 151 in one direction against the force exerted by a screw adjustment device 153. Turning of screw device 153 regulates the amount of flux interlinkage in transformer core 150 and thereby the effective potential applied across potentiometer 141.

Rectifier 142 develops a D.-C. control voltage which is the resultant of the determined air flow and the determined pressure differential through the pulverizer. This control voltage is applied to the D.-C. control coil 154 of a saturable reactor 155 whose A.-C. power coil is connected across terminals 41'. The impedance of coil 156 is thus a function of the control voltage and, through a rectifier 157, regulates the D.-C. current through control coil 159 of a reactor 160 having its A.-C. power coil 161 connected in a supply circuit for motor 60'. A fullwave rectifier 162 is connected in series with coil 161. The variations in the current flow through coil 159 correspondingly vary the impedance of power coil 161 and thus the effective D.-C. potential applied to motor 60'. The speed of operation of the latter is thus made a function of the control voltage which corresponds to the air flow rate pressure differential ratio.

In this embodiment of the invention, the position of the load line L is varied by moving contact 143 of potentiometer 141, or by use of screw adjustment device 153 to shift core 151 of transformer 150. The slope of the load line L is changed by adjustment of tap 59' of resistor 58'.

While specific embodiments of the invention have been shown and described in detail to illustrate the application of the invention principles, it will be understood that the invention may be otherwise embodied without departing from such principles.

I claim:

1. In a control system for the material feed to a variable air supply air-swept pulverizer arranged to discharge a fluent mixture of pulverized material and air, in combination, a pair of transformers each having a primary energized by alternating current, a secondary, and a core movable through a predetermined range to change the output of the secondary between a predetermined maximum and a predetermined minimum; means to move one of said cores to provide an output potential representative of a first variable corresponding to the quantity of material undergoing pulverization; means to move the other of said cores to provide an output potential representative of a second variable corresponding to the rate of air flow; a pair of resistance each across the output of a different one of said secondaries; circuit means combining the outputs of the two resistances in series relation to provide a control potential representative of the resultant of said first and second variables; a potentiometer connected to a source of electrical energy and with its output in series relation with the combined outputs of the two resistances to adjust the threshold value of such control potential; and variable speed motor means adapted to be operated at a speed in accordance with the value of such control potential to vary the rate of material feed in accordance with variations in the rate of air flow to maintain a predetermined ratio between the quantity of material undergoing pulverization and the rate of air flow.

2. The combination claimed in claim 1 in which one of said resistances is variable to pre-set such predetermined ratio.

3. The combination claimed in claim 2 in which the variable resistance is connected across the output of the secondary whose output potential is varied corresponding to the quantity of material undergoing pulverization.

References Cited in the file of this patent

UNITED STATES PATENTS

| | | |
|---|---|---|
| 1,413,934 | Ransey et al. | Apr. 25, 1922 |
| 1,641,762 | Jones | Sept. 6, 1927 |
| 1,784,483 | Davidson et al. | Dec. 9, 1930 |
| 2,001,543 | Payne | May 14, 1935 |
| 2,177,597 | Haines | Oct. 24, 1939 |
| 2,212,125 | Peebles | Aug. 20, 1940 |
| 2,226,923 | Cross | Dec. 31, 1940 |
| 2,244,639 | Martin | June 3, 1941 |
| 2,403,976 | Harvey | July 16, 1946 |
| 2,563,899 | Weincko | Aug. 14, 1951 |
| 2,665,066 | Hornfeck | Jan. 5, 1954 |